United States Patent
Deshpande

(10) Patent No.: US 8,355,452 B2
(45) Date of Patent: Jan. 15, 2013

(54) SELECTIVE FRAME DROPPING FOR INITIAL BUFFER DELAY REDUCTION

(75) Inventor: Sachin G. Deshpande, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1512 days.

(21) Appl. No.: 11/465,761

(22) Filed: Aug. 18, 2006

(65) Prior Publication Data

US 2007/0201500 A1    Aug. 30, 2007

Related U.S. Application Data

(60) Provisional application No. 60/777,457, filed on Feb. 27, 2006.

(51) Int. Cl.
*H04N 7/12* (2006.01)

(52) U.S. Cl. ............... 375/240.29; 375/240.25

(58) Field of Classification Search ........... 375/240, 375/240.01, 240.12, 240.25, 240.26, 240.29; 348/439.1; 382/233
See application file for complete search history.

(56) References Cited

U.S. PATENT DOCUMENTS

| | | | |
|---|---|---|---|
| 5,185,863 A | | 2/1993 | Hamstra et al. |
| 5,689,460 A | | 11/1997 | Ooishi |
| 6,034,731 A | * | 3/2000 | Hurst, Jr. ............... 375/240.26 |
| 6,072,742 A | | 6/2000 | Ooishi |
| 6,262,776 B1 | | 7/2001 | Griffits |
| 6,356,309 B1 | * | 3/2002 | Masaki et al. ............ 348/439.1 |
| 7,123,771 B2 | * | 10/2006 | Curry ........................... 382/233 |
| 7,257,162 B2 | * | 8/2007 | Viscito et al. ........... 375/240.25 |
| 2002/0031032 A1 | | 3/2002 | Ooishi |

FOREIGN PATENT DOCUMENTS

| | | |
|---|---|---|
| EP | 0 430 051 A2 | 6/1991 |
| JP | 02170686 A2 | 7/1990 |
| WO | WO 01/15458 A2 | 3/2001 |
| WO | WO 02/19708 A1 | 3/2002 |
| WO | WO 02/19709 A1 | 3/2002 |

OTHER PUBLICATIONS

Ribas-Corbera,Chou,Regunathan,"A Generalized Hypothetical Reference Decoder for H.264/AVC,"IEEE Transactions on Circuits and Systems, Jul. 2003, pp. 674-687,vol. 13, No. 7, US.

Kalman,Mark;Girod,Bernd; Van Beek, Peter,"Optimized Transcoding Rate Selection and Packet Scheduling for Transmitting Multiple Video Streams Over a Shared Channel,"ICIP 2005.

\* cited by examiner

*Primary Examiner* — Allen Wong
(74) *Attorney, Agent, or Firm* — Brooks Acordia IP Law, PC; Pejman Yedidsion; David Ripma

(57) ABSTRACT

The embodiments of the present invention provide for methods, devices, and systems adapted to reduce initial buffering delay encountered at the client side by selectively dropping content elements of a source content within a drop interval prior to transmission to a client or receiver. The drop interval associated with the initial buffering delay value at the client.

30 Claims, 13 Drawing Sheets

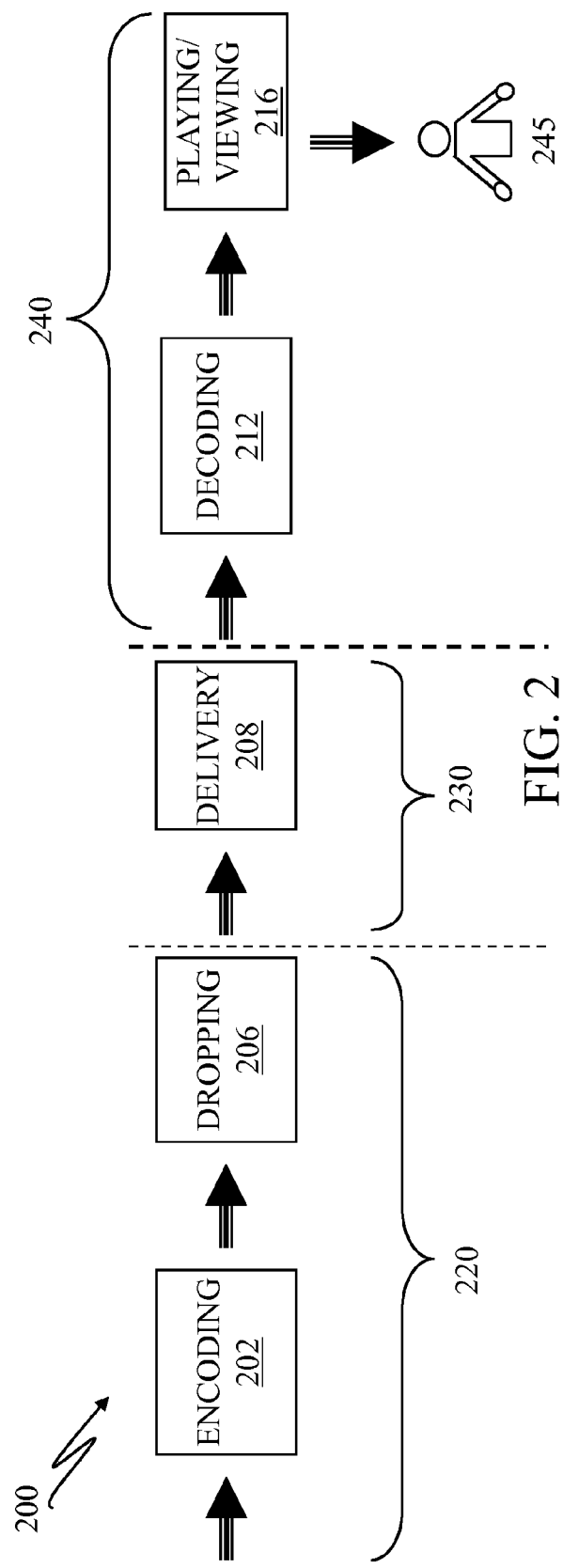
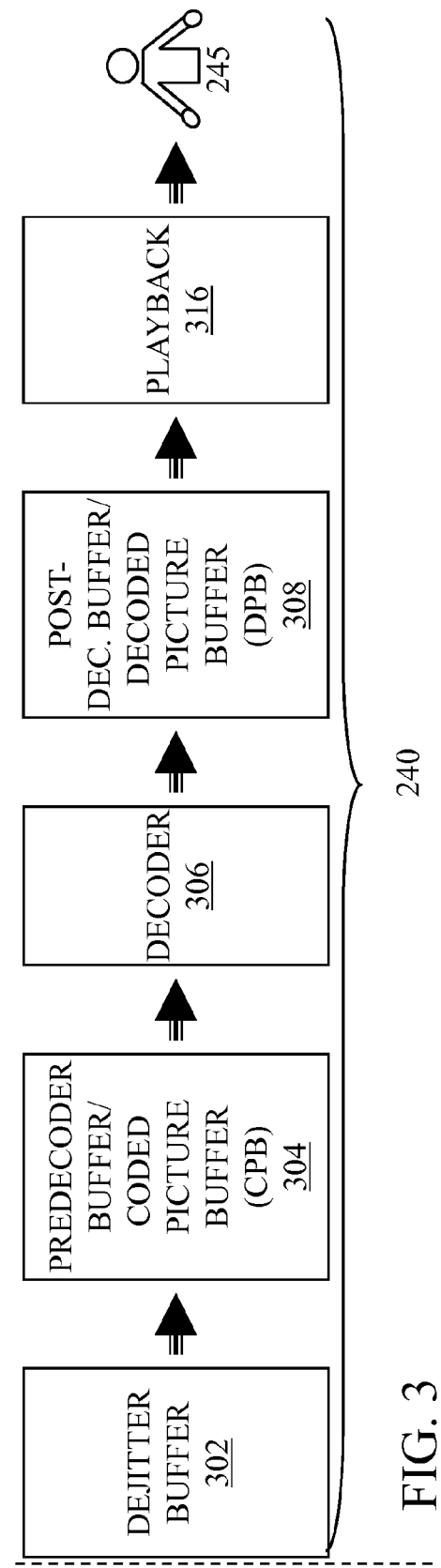

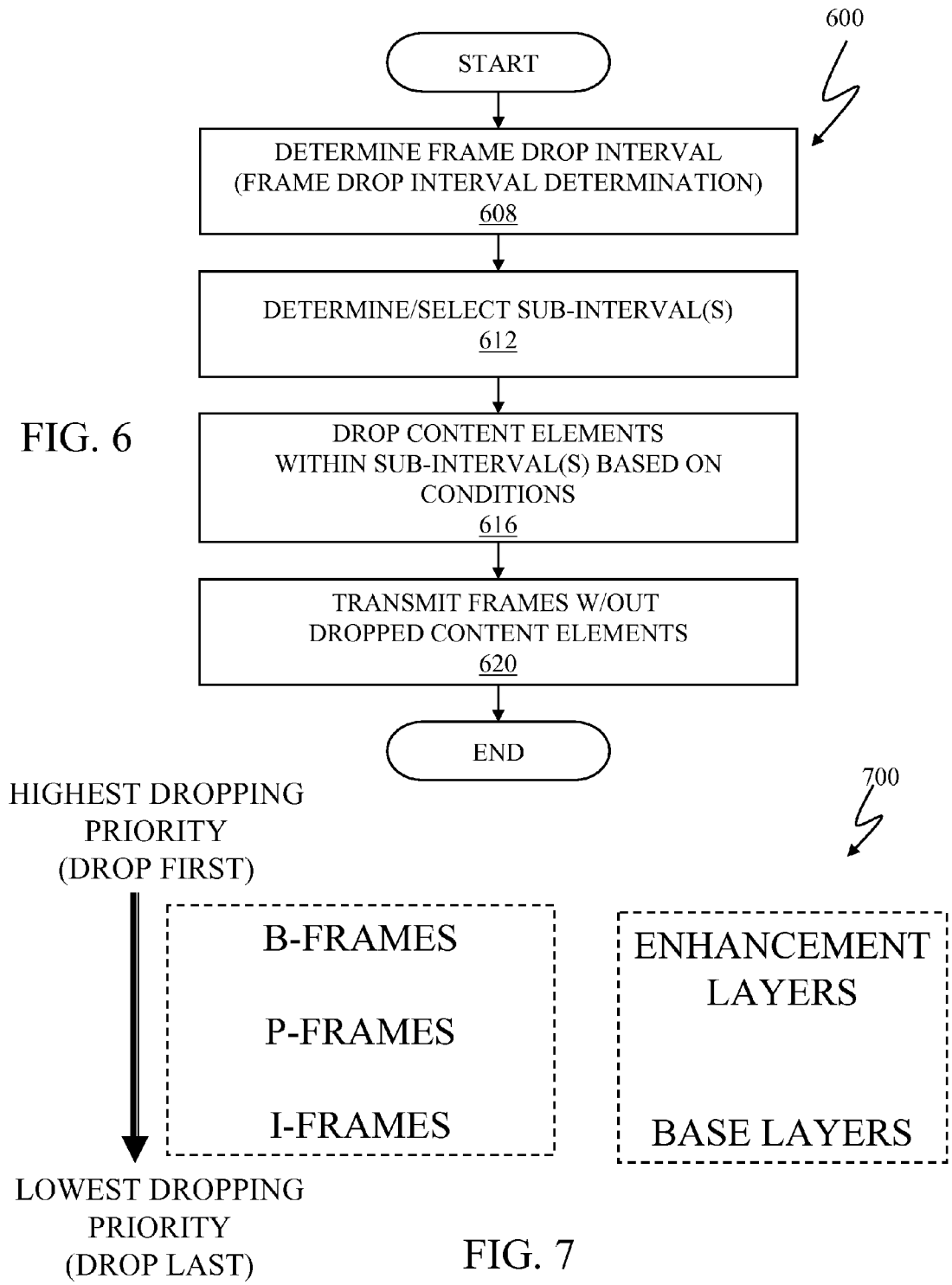

SELECTIVE FRAME DROPPING FOR INITIAL BUFFER DELAY REDUCTION

CROSS-REFERENCE TO RELATED APPLICATIONS

This application claims the benefit of U.S. Provisional Patent Application Ser. No. 60/777,457 filed Feb. 27, 2006, entitled "Selective Frame Dropping for Initial Buffer Delay Reduction," which is hereby incorporated by reference herein in its entirety including all appendixes, if any, for all purposes.

FIELD OF THE INVENTION

The embodiments of the present invention relate to buffering of streaming data, particularly to reducing buffer delays.

BACKGROUND

With the proliferation of digital data, media content have been expected to come from various sources, including wide area networks, local area networks, broadcasts, cable, and pre-stored media. Digital data may be pre-encoded and stored or may be data encoded in real time. When a client device or receiver receives streaming media or content via a network, such device typically buffers a small portion of the streaming content to improve the streaming performance. When a user requests playback of a streaming content, the client typically also performs an initial buffering before starting the playback. This initial buffering manifests itself as a delay to the user. Similarly when the user desires to seek/jump to an intermediate timeline location of the streaming content, the client device also performs an initial amount of buffering before starting the playback. A long initial buffering delay hampers the end-user experience. Ways of reducing such delays are thus highly desirable.

SUMMARY

In one aspect, a method of reducing initial buffer latency at a client is provided. The method includes the steps of filtering a bit stream comprising one or more encoded content elements of a source content by dropping at least one of the one or more encoded content elements within a drop interval, wherein the drop interval is associated with the initial buffering delay value at the client; and transmitting the filtered bit stream to the client.

In another aspect, a device, adapted to be operably coupled via one or more network segments to a client, is provided. The device includes an input/output interface and a selective dropper entity module. The input/output interface is adapted to operably couple the device to the client via the one or more network segments. The selective dropper entity module is adapted to filter a bit stream comprising one or more encoded content elements of a source content by dropping at least one of the one or more encoded content elements within a drop interval. The drop interval is associated with an initial buffering delay at the client. The selective dropper entity module is also adapted to transmit the filtered bit stream to the client.

In another aspect, a system adapted to transmit streaming data is provided. The system includes a first device, a second device, and one or more network segments. The first device is operably coupled to the second device via the one or more network segments. The first device also includes an input/output interface that is adapted to operably couple the first device to the second device; and a selective dropper entity module. The selective dropper entity module is adapted to filter a bit stream comprising one or more encoded content elements of a source content by dropping at least one of the one or more encoded content elements within a drop interval. The drop interval is associated with an initial buffering delay at the second device. The selective dropper entity module is also adapted to transmit the filtered bit stream to the second device. The second device includes an input/output interface that is adapted to operably couple the second device to the first device and a decoder module that is adapted to decode and decompress the received filtered bit stream.

In another aspect, a system is provided. The system includes a first device, a second device, and a third device. The first device is operably coupled to the second device and is adapted to transmit to the second device a bit stream associated with a source content. The second device is operably coupled to the third device and is adapted to receive the bit stream transmitted by the first device. The second device includes a selective dropper entity module that is adapted to filter the bit stream comprising one or more encoded content elements of the source content by dropping at least one of the one or more encoded content elements within a drop interval, wherein the drop interval is associated with an initial buffering delay at the third device, and transmit the filtered bit stream to the third device. The third device includes a decoder module that is adapted to decode and decompress the received filtered bit stream from the second device.

BRIEF DESCRIPTION OF THE DRAWINGS

The present invention is illustrated by way of example and not limitation in the figures of the accompanying drawings, and in which:

FIG. 2 is a high-level block diagram of source content distribution, according to an embodiment of the invention;

FIG. 3 is a more detailed diagram showing the decoding and presentation phase, at the client side, according to an embodiment of the invention;

FIG. 6 is a high-level flow chart illustrating a manner in which encoded and/or pre-stored source content may be processed, according to an embodiment of the invention;

FIG. 7 is a block diagram illustrating exemplary priority conditions for dropping content elements, according to an embodiment of the invention;

DETAILED DESCRIPTION

Figure 1:
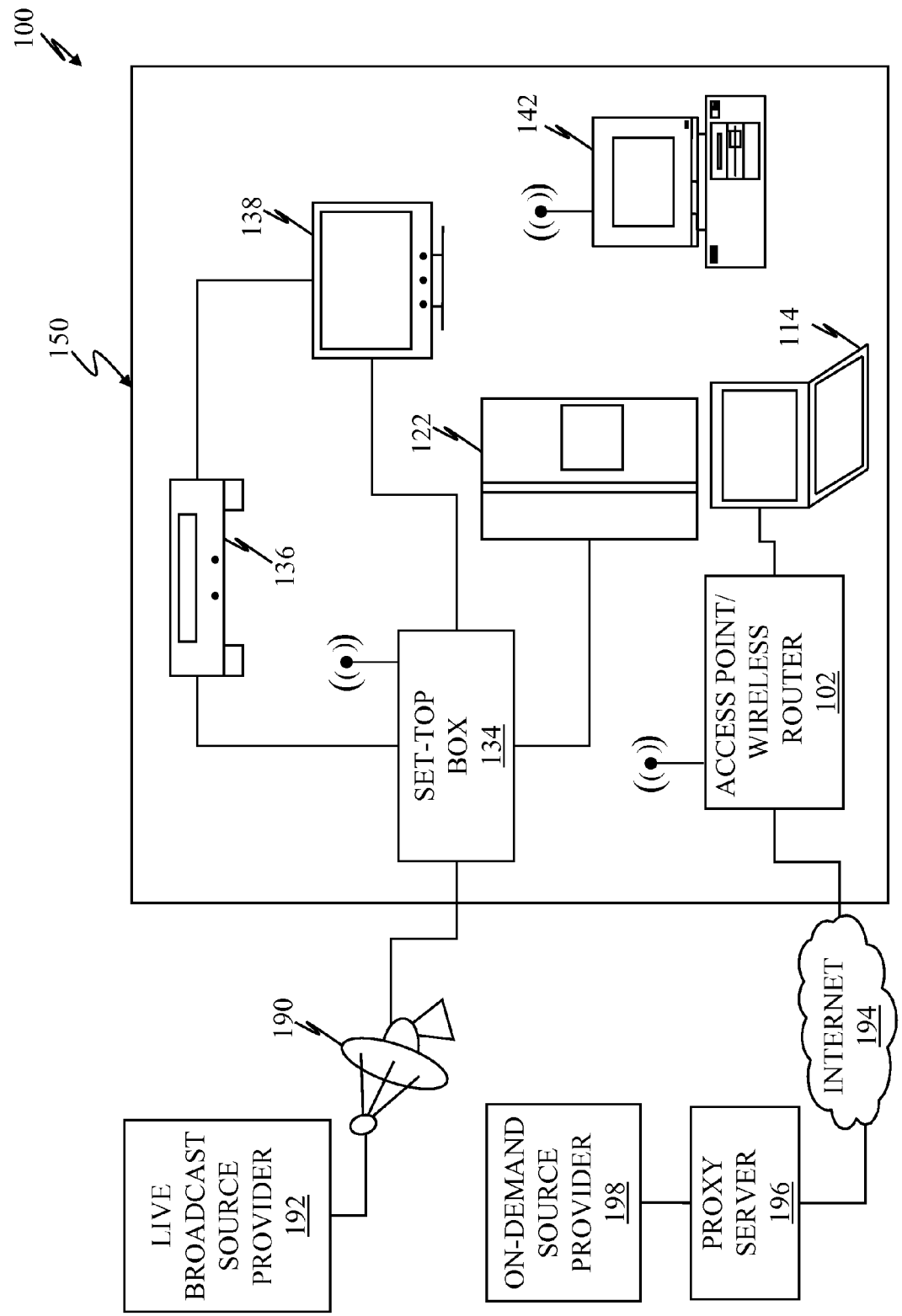
FIG. 1 is a high-level block diagram of an exemplary system according to an embodiment of the invention.

To better understand the figures, reference numerals within the one hundred series, for example, 134 and 190, are initially introduced in FIG. 1, reference numerals in the two hundred series, for example, 202 and 206, are initially introduced in FIG. 2, and so on and so forth. So, reference numerals in the eleven hundred series, e.g., 1102 and 1112, are initially introduced in FIG. 11.

The embodiments of the present invention generally relate to streaming source content or media. In general, streaming media technology enables live or on-demand distribution of such contents. Streaming media in general is the transfer of source content so that this content may be received as a continuous real-time stream. Streamed source content elements are typically transmitted by a server/server application and received by client(s)/client application(s). The client thus may start presenting or playing back the source content as soon as the receiving client application has sufficient data stored in its receiving buffer. The embodiments of the present invention also relate to reducing the minimum initial buffering performed at the client by selectively dropping content elements of a source content prior to the reception at a client device/receiver.

FIG. 1 is an exemplary diagram of a system 100 wherein digital source content, such as audio and/or visual data, are transmitted or streamed according to some embodiments of the invention. In this exemplary embodiment, a local network 150 includes a number of consumer electronics, including a set-top box 134, a digital television (DTV) 138, a wireless personal computer (PC) 142, a digital video or versatile disc (DVD) player 136, a computer laptop 114, a gateway/router 102, and a consumer appliance/device 122, connected via various network links or segments. These various consumer electronics are typically adapted to be networked with each other. Examples of consumer appliances that may be networked into the system 100 include televisions and refrigerators with user interfaces, including displays, radios adapted to receive streaming source contents, and any other devices adapted to receive source contents via the network and present them accordingly. The local network 150 comprises various networks—e.g., power line communication (PLC) networks, 802.11a wireless networks, 802.11g wireless networks, and 802.11b wireless networks. Future network specifications such as 802.11n may also be incorporated in such networks. Ethernet networks, and various network segments, which may include wired and/or wireless network segments. The local network 150 may be operably coupled to one or more source content providers 192, 198, for example, via satellite, cable, and/or terrestrial broadcast 190 or via an external wide area network, such as the Internet 194. A source content provider 192, 198 may provide pre-encoded and stored source content and/or live real-time or substantially real-time encoded source content to be received by a receiver/client and accordingly be presented in a user interface. For example, a movie may be requested from a source provider 198 that provides on-demand pre-encoded and stored data. The encoded source content is then transmitted and streamed over network segments, which may include wide, local, and/or metropolitan area network segments. This source content is then received by a set-top box 134, for example, via a home wireless network and presented by a digital television 138. In some embodiments, a source provider or an intermediate network node also has one or more proxy servers 196 that are operably connected to the source provider 198. A proxy server 196 thus may be a node in the system, for example, where source content may directly or indirectly be requested.

In video coding standards, a compliant bit stream may be typically decoded by a hypothetical decoder that is conceptually connected to the output of an encoder and typically consists of a decoder buffer, a decoder, and a display unit. The embodiments of the present invention are discussed in relation to a generalized hypothetical reference decoder (GHRD) conforming to the H.264/Advanced Video Coding (AVC) specifications or standards. H.264 has been adopted by the Moving Picture Experts Group (MPEG) standards to be a video compression scheme. H.264/AVC video coding specification has been developed jointly by video codec experts from International Telecommunications Union (ITU) and International Standards Organization (ISO), and the standardization effort is also known by other names, including Joint Video Team (JVT), ITU-T H.26L, or ISO MPEG-4 part 10. The use of H.264/AVC is for exemplification purposes and to facilitate understanding of the various embodiments of the invention. The embodiments of the invention, thus, may apply to other video encoding and/or decoding standards, other file formats, and generally to source contents that are encoded, transmitted, and decoded, particularly utilizing a buffer area. The hypothetical decoder is known as the hypothetical reference decoder (HRD) in H.263 and as a video buffering verifier in MPEG. Information about H.264/AVC may be found in "A Generalized Hypothetical Reference Decoder for H.264/AVC" by Jordi Ribas-Corbera, et al., published in the IEEE Transactions on Circuits and Systems for Video Technology, vol. 13, No. 7, July 2003, pp. 674-687, hereinafter referred to as the "GHRD document."

Video/Source content streaming in general involves encoding the source content by defining or breaking the source content into content elements—including compressing such elements, transmitting these elements in succession, and decoding and playing back (playback) these elements at the receiver while the source content is still being delivered and without having to wait for the entire source content to be delivered. Source contents, e.g., videos, multimedia data, audio data, visual data and/or audiovisual data, may be captured and encoded for real-time communication or they may be pre-encoded and stored for later viewing. Examples of contents for real-time communication include live on-demand broadcast of a concert or sporting event, videoconferencing, movies, videophone communication, and interactive games. Examples of pre-encoded and stored source contents include those that are on digital video discs (DVDs), compact discs (CDs), and those stored locally or remotely on one or more servers, including proxy servers, if applicable.

A source content typically consists of a set of content elements. These content elements, typically depending on implementation, may be frames, packets, groups of pictures (GOPs), slices, pictures, groups of slices, fields, layers, macroblocks, and other data units. The content elements may be subdivided into further content elements, e.g., a frame may be further defined by fields or macroblocks. The source content is thus typically encoded, including compressed, to generate properly encoded content elements. The encoding algorithm and the decoding algorithm used by an encoder and decoder, respectively, may depend on the standard being supported.

FIG. 2 is a high-level flowchart 200 showing three exemplary basic phases of source content distribution, according to some embodiments of the invention. For illustrative purposes, let us assume that a media source provider 192, 198 is providing a source content to a consumer 245. This source content may have been previously captured or captured in real-time. The three phases may include the encoding and dropping phase 220, the delivery phase 230, and the decoding and presentation phase 240. The encoding and dropping phase 220 includes encoding 202 the source content and dropping 206 one or more of the encoded source content elements to produce a filtered set of encoded source elements. The timing of the encoding 202 and dropping 206 operations may be based on whether the source content is encoded in real-time or substantially real-time, or whether it is pre-encoded and stored. The step of encoding 202 typically includes dividing the source content into one or more components and compressing such components into one or more encoded source content elements. The structure, format, and/or data contained in the source content and the content elements may depend on the compression technology, e.g., codec, or standard being supported, e.g., MPEG-2, MPEG-4, RealMedia, and Macromedia Flash. For example, a source content may be encoded to support MPEG-2, MPEG-4, H.263, and/or H.264 standards. Once the source content is encoded into one or more encoded source content elements, the dropping operation 206 is performed to drop one or more of the source content elements, thereby creating a filtered set of source content elements. This means that some content elements are intentionally not transmitted to the client/receiver. This filtered set is then delivered or transmitted 208 via one or more network segments using a transport protocol, which may include user datagram protocol (UDP), transmission control protocol (TCP), and real-time transport protocol (RTP) etc. The filtered set of content elements is then received by a decoder and decoded 212 for presentation 216 to a user 220. The decoder, to appropriately decode the received filtered content elements, has to support the compression scheme performed by the encoder, i.e., adapted to support a common interpretation scheme such that the decoder is able to deconstruct the bit stream(s) into a format that may be used for presentation.

In some embodiments, the encoding 202 and the decoding 212 steps may be performed by codecs. A codec in general refers to the compression/encoding and/or decompression/decoding scheme used typically in video or other multimedia processing. A codec may be an audio codec, a visual codec, or an audiovisual codec. A codec typically includes an algorithm that is used to compress the source content into fewer bytes. By following this algorithm, applications such as encoders, decoders, and media players may reliably compress and decompress data. Thus, data encoded by encoder supporting the MPEG standard, for example, has to be decoded by a corresponding decoder adapted to support the appropriate MPEG standard. A codec may encode and/or decode a source content into one or more compression schemes.

The encoding 202 step and the dropping step 206 may also be performed by separate applications/entities that may also reside in different devices. For example, a server of a source content provider encodes source contents, thereby providing pre-encoded and stored source contents already available for viewing. A proxy server in response to a consumer's request, for example, may request one of the encoded source contents and, prior to transmission, filters that encoded content. Thus, the encoded source content sent to a client for viewing is less that the encoded source content received or stored by the proxy server or encoded by the encoder.

FIG. 3 is a more detailed flow chart showing an exemplary decoding and presentation phase 240. The client-side buffering scheme may consist of three logical buffers: a dejitter buffer 302, a predecoder buffer/coded picture buffer (CPB) 304 and a post-decoder buffer/decoded picture buffer (DPB) 308. The CPB 304 is also called a receiver buffer, playout buffer, and decoder buffer. The dejitter buffer 302, CPB 304, and the DPB 308 are logical roles. Physically they may be contained in a single memory entity, e.g., a memory chip, or be separate. The dejitter buffer 302, sometimes also called a jitter buffer or network buffer, is typically mainly used to handle variations in the transmission delays, e.g., packet transmission delays and bandwidth variations. The CPB 304 is mainly used to avoid underflow and overflow, which may otherwise happen due to bit-rate fluctuations of the bit stream. In some cases the dejitter buffer 302 and CPB 304 may be physically implemented in a single buffer.

In general, encoded source content elements are transmitted as bit streams. These bit streams are received and are typically stored in the dejiiter buffer 302 and/or CPB 304, at the client side, until the CPB 304 reaches an initial or minimum decoder buffer fullness (F), typically in bits. This initial buffer value or initial decoder buffer fullness (F) is a property of the bit stream. Once the CFB 304 reaches its initial decoder buffer fullness F, the decoder 306 then removes the appropriate bit streams from the CPB 304 and decodes these removed bits for presentation or playback 316 to the consumer 245. The CPB 304, however, continuously receives filtered encoded bit streams. In some embodiments, a client application and/or device may perform additional post-decoding buffering, typically stored in the decoded picture buffer (DPB) 308.

In an exemplary embodiment, a hypothetical reference decoder, e.g., the GHRD for H.264/AVC, may operate to N sets of transmission rate and buffer size parameters for a given bit stream. Each set characterizes a leaky bucket model, with each bucket associated with three values. This exemplary leaky bucket model determines both the minimum or initial decoder buffer size and the minimum decoder buffer delay using three parameters, R, B, and F. These three values include:

R=the transmission bit rate (typically in bits per second) at which bits typically may leave the encoder buffer and enter the decoder buffer after a constant delay. This constant delay, for example, is the encoding-to-decoding delay.

B=is the capacity, typically in bits, of the decoder buffer.

F=is the initial decoder buffer fullness/minimum initial buffering, typically in bits, before the decoder typically starts removing bits from the buffer.

In this exemplary embodiment, the initial or start-up buffering delay, D, may be expressed as D=F/R (seconds). The embodiments of the present invention relate to reducing the minimum initial buffering delay D of populating the CPB before playback 316 by reducing the suggested required minimum initial decoder buffer fullness F by selectively dropping content elements of the source content.

Figure 4:
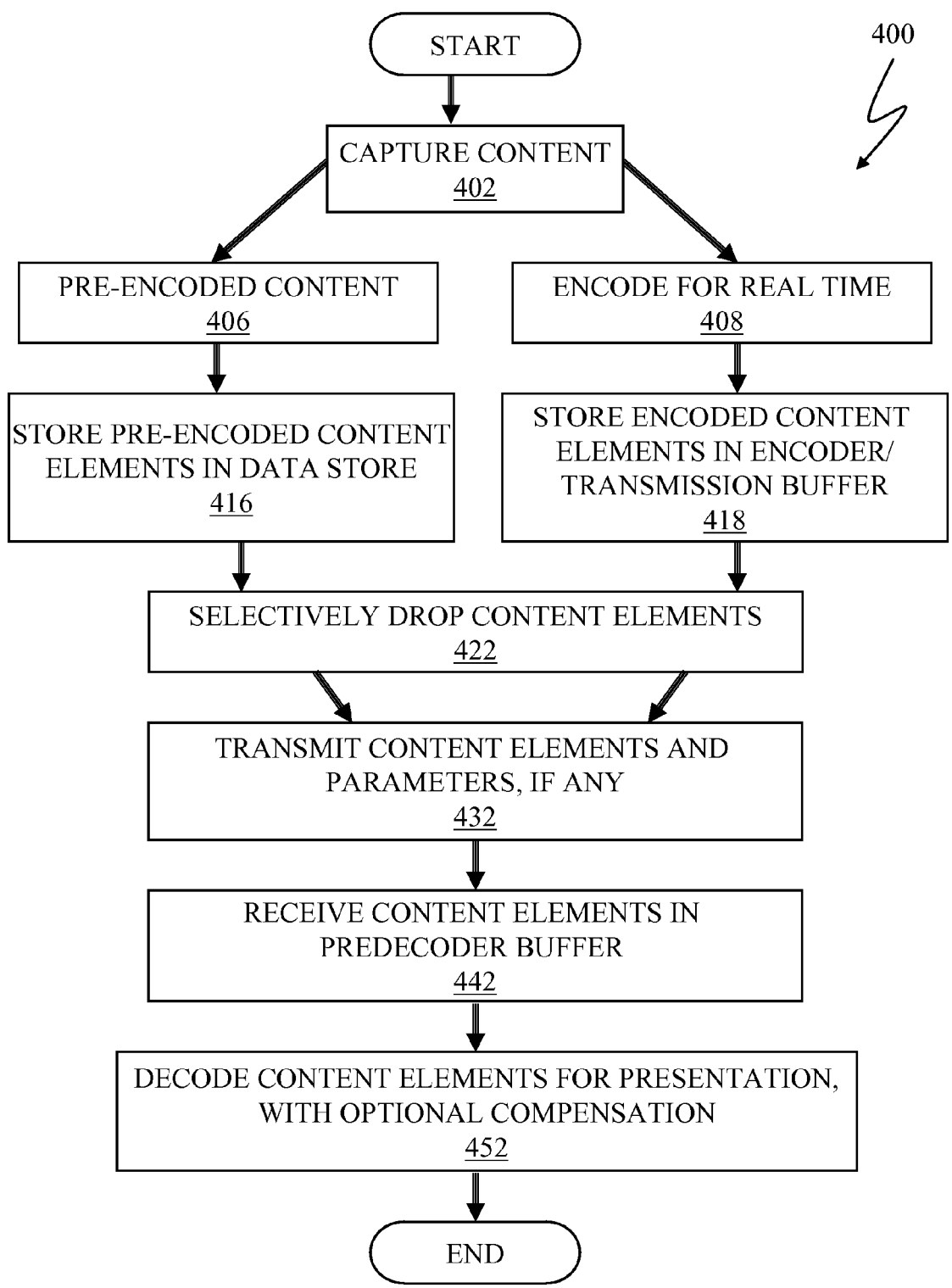
FIG. 4 is a high-level flowchart showing a manner by which a source content may be processed within a system, according to an embodiment of the invention.

FIG. 4 is another exemplary flowchart 400 of embodiments of the present invention. In general, the source content is captured 402 by a capture device, e.g., a video recorder, camcorder, and/or a sound recorder. Depending on implementation, the captured source content is then encoded for real-time communication 408. Alternatively pre-encoded content 406 may be available from some previous encoding. Pre-encoded content elements may be stored in a data store 416, e.g., a hard drive of a streaming media server or on a DVD. Encoded source content elements for real time communication 408 may be stored or placed in a buffer or memory waiting for transmission or in preparation for transmission 418.

Prior to transmission, a process is performed to selectively drop encoded source content elements, thereby minimizing or reducing the initial decoder buffer fullness F at the client size and reducing the initial start-up delay D. This dropping process 422 is performed prior to transmission; thus it may be performed prior to storage or buffering, but in some embodiments, it may be performed after such storage/buffering but typically prior to transmission. The filtered set of encoded source content elements, which has undergone the selective dropping process, is then transmitted via a network 432. The encoding 406, 408, storing/buffering 416, 418, dropping 422, and transmission 432 are typically performed in a streaming manner. For example, the encoding process may be encoding frame n, the storing/buffering process may be storing frame n−1, the dropping process is filtering n−2 frame, and frame n−3 is being transmitted. In some embodiments, parameters, e.g., peak transmission bit rate R, buffer capacity B, and/or initial decoder buffer fullness F, may be exchanged between the source and the client. This parameter exchanged may be included as part of the encoded source content or may be transmitted, e.g., as an initial or set-up bit stream.

The selective dropping process may also apply to variable bit-rate (VBR) encoded media. The process may also be employed by a streaming server thereby reducing initial delay D at the client side. Alternatively, this process may be implemented by a transrater and/or transcoder. In other embodiments, the selective dropping process may also be applied in advance on a pre-encoded or pre-stored bit stream to decide which frames to drop to reduce the suggested minimum initial buffering F. Transcoding is typically a digital-to-digital conversion or encoding from one, usually lossy, codec to another. Transcoding may also involve decoding/decompressing the original source content or content element, typically the bit stream, to one format and encoding/compressing that source content or content element into the target format. Transrating is generally converting or encoding from a higher bit rate to a lower bit rate, without typically changing format. Transcoding, for example, may be used to convert a source content in MPEG format to H.263 format.

The filtered content elements are then typically received and stored 442 in the CPB 304. When the initial buffer fullness F has been reached, the decoder 306 decodes the received content elements and the source content is presented to the user 452, while the rest of the content elements of the source content are still being processed. In some embodiments, receiver/client-side processing may optionally be performed, e.g., dropped or missing content elements detection, correction and compensation, including forward error correction coding, error concealment, spatial and temporal interpolation, extrapolation to estimate the drop content elements, and frame repeat/field repeat/frame interpolation to insert frames to compensate for the dropped frames.

Figure 5:
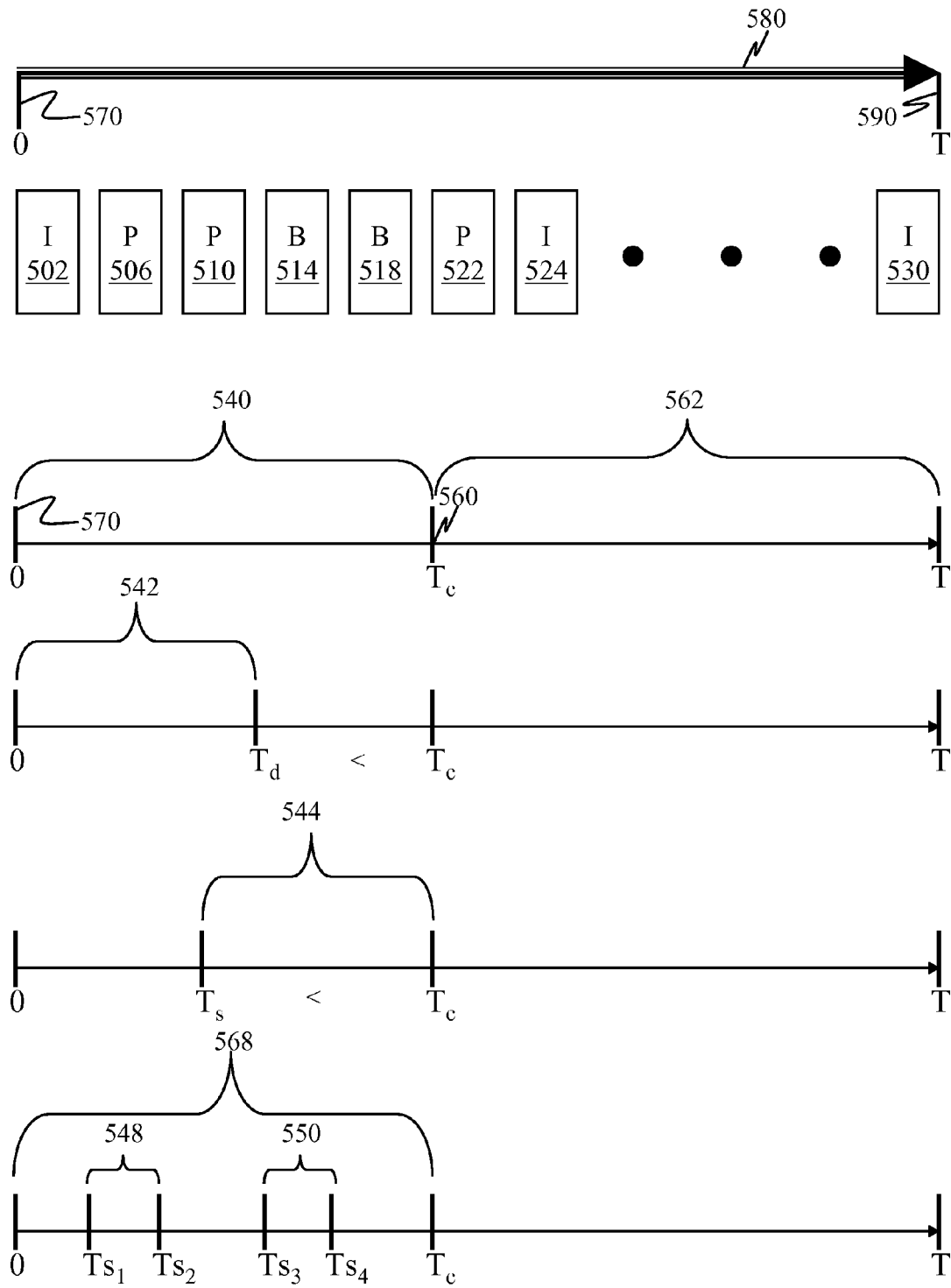
FIG. 5 is an exemplary bit stream that may be processed by the selective dropping entity process or module, according to an embodiment of the invention.

FIG. 5 is an exemplary media bit stream containing a portion of a pre-encoded and/or pre-stored source content or media. For illustrative purposes, the bit stream consists of N frames. The bit stream has the following parameters:

f=encoded with a frame rate f frames per second;

$R_{ave}$=average bit-rate in bits per second;

T=total time duration of the bit stream in seconds.

Thus, the total number of frames, N=f*T. The frames in the bit stream are denoted as $\{fr_1, fr_2, \ldots, fr_N\}$, and the number of encoded bits for each frame are denoted as $\{b_1, b_2, \ldots, b_N\}$.

The exemplary bit stream consists of independently encoded frames, e.g., I-frames, and dependently encoded frames, e.g., P-frames, B-frames, and PB-frames, hierarchical B frames, etc. An I-frame is an intra-coded frame, where the frame is typically coded independently of all other frames, e.g., intra prediction. I-frames typically do not depend on other frames and are sometimes referred to as IDR frames. A P-frame is a predictively coded frame, where the frame is coded based on a previously coded frame, e.g., I- or P-frame. Typically, a P-frame depends on frames that have preceded it. A B-frame is typically a bi-directionally predicted or bi-predicted frame, where the frame is coded based on previous and future coded frames, e.g., I- and P-frames. This exemplary source content structure may be found in MPEG-2 and MPEG-4 formats. H.263, for example, utilizes a PB frame type that combines a P- and B-frame. H.264, for example, utilizes a hierarchical structure for B frames.

In some embodiments, the media stream is adapted to support random access by having independently coded I-frames inserted in the bit stream, e.g., let a bit stream consists of I-frames $\{I_0, I_1, \ldots, I_m\}$ at time $\{0, t_1, \ldots, t_m\}$ on the stream timeline. Random access may be performed by accessing an I-frame within the bit stream.

Referring back to FIG. 5, the exemplary bit stream 580, from time zero, 0, 570, to time T 590, consists of I-frames 502, 524, 530, P-frames 506, 510, 522, and B-frames 514, 518. FIGS. 5 and 6 are typically discussed in conjunction with each other.

FIG. 6 is a high-level flowchart 600 of an exemplary selective dropping process/selective content element reduction process, which may be performed by an application, a device, or any entity—herein referred to as a Selective Dropper Entity (SDE). In this exemplary embodiment, the source content typically has been entirely pre-encoded and pre-stored, e.g., as a stored bit stream, in a data store. In this exemplary embodiment, the number of encoded bits for each frame is known by the SDE. The SDE may be embodied in software, hardware, or both. Furthermore, the functions of the SDE may be embodied in multiple entities.

In the first operation, the SDE determines the frame drop valid interval (step 608). Based from such frame interval, one or more sub-intervals are defined (step 612). Once the sub-interval(s), within the frame interval, are determined, content elements within the sub-intervals are dropped based on one or more conditions (step 616). The bit stream of the encoded and typically pre-stored source content is then transmitted without the dropped content elements (step 620).

The frame drop valid interval 540 determination operation (step 608) typically involves determining the main interval, wherein dropping content elements may reduce the minimum initial buffering delay D. This interval is typically based on the HRD buffering model employed for the particular source content/media encoding. Typically, a cut-off time or clip time 560, $T_c$ (where $T_c <= T$), within the timeline 580, is determined wherein dropping content from the time after $T_c$ 562 does not reduce the minimum initial buffering delay at the receiver side. For example, the $T_c$ for the H.264/AVC GHRD model, discussed in the GHRD document, may be the $T_c$ that corresponds to the time when the predecoder buffer 304 attains the minimum occupancy after a frame removal. Based on the frame drop interval 540, which corresponds to the timeline location between $[0, T_c]$, one or more sub-intervals, i.e., a subset of [0, $T_c$], may be determined (step 612). The frame drop valid interval 540 is the interval on the timeline wherein content elements, in this exemplary embodiment—frames, may be dropped, i.e., not transmitted to the receiver. The various strategies below may be used:

a) Drop content elements only within an initial sub-interval/sub-time-interval [0, $T_d$] 542 where $T_d<T_c$. In this embodiment, the user during playback may notice a reduced frame rate during initial $T_d$ seconds of streaming media. In some embodiments, this may confine the effect of content element dropping to only a portion of the overall frame drop timeline.

b) Drop content elements only during the sub-interval [$T_s$, $T_c$] 544, where $T_s<=T_c$. In some embodiments, a user may experience full frame rate for the media stream except during the sub-interval [$T_s$, $T_c$]. In some embodiments, this may be useful where a user typically does not watch the entire media section but just an initial portion of it, before moving on to watch another media section, e.g., during movie previews or ads.

c) Drop content elements between one or more defined sub-intervals 568, e.g., [$Ts_1$, $Ts_2$] 548, where $Ts_1<Ts_2$ and $Ts_2<T_c$. This sub-interval determination may be based on the knowledge of the media content, e.g., the sub-interval [$Ts_1$, $Ts_2$] 548 corresponds to a commercial during a program. In some embodiments, content elements may be dropped in multiple sub-intervals, e.g., [$Ts_1$, $Ts_2$] 548 and [$Ts_3$, $Ts_4$] 550 within [0,$T_c$] 540,568. These sub-intervals 548, 550 may correspond, e.g., to commercials.

d) Drop content elements inside [0, $T_c$], i.e., Td=Tc (not shown). In some embodiments, this may result in spreading the effect of content element dropping, for example, to a longer portion of the timeline, and may reduce the number of frames dropped in any given time segment, i.e., the frames per second may be closer to the original frame rate f.

Referring back to FIG. 6, after the frame drop valid interval is determined (step 608), the sub-intervals are optionally determined as described above (step 612). Within the chosen sub-interval(s), each defined by a start time and end time, [$T_S$, $T_E$], content elements are dropped based on certain dropping conditions (step 616). Such dropping conditions, e.g., may be based on priority, size, and/or distribution conditions. The filtered set of content elements is then accordingly transmitted (step 620).

FIG. 7 shows a high-level block diagram 700 of an exemplary set of dropping priority conditions illustrating the order of dropping/filtering content elements. In general, the priority may be based on the video compression technology employed, in particular, the coding dependencies between content elements. For example, using MPEG-2, the priority of dropping generally starts with dropping B-frames first then followed by P-frames. This priority scheme is based on a dependency, wherein the content elements dropped first are those that typically minimize the coding dependency chain and/or encoding error propagation. I-frames are dropped last, if dropped at all.

In scalable or layered video scheme, the source content is typically coded into a base layer and one or more enhancement layers. In this exemplary embodiment, the base layer has less or no coding dependency as compared to enhancement layers. In this exemplary priority condition, the content elements associated with the enhancement layers are dropped first and those associated with the base layers are dropped last or not at all.

Figure 8:
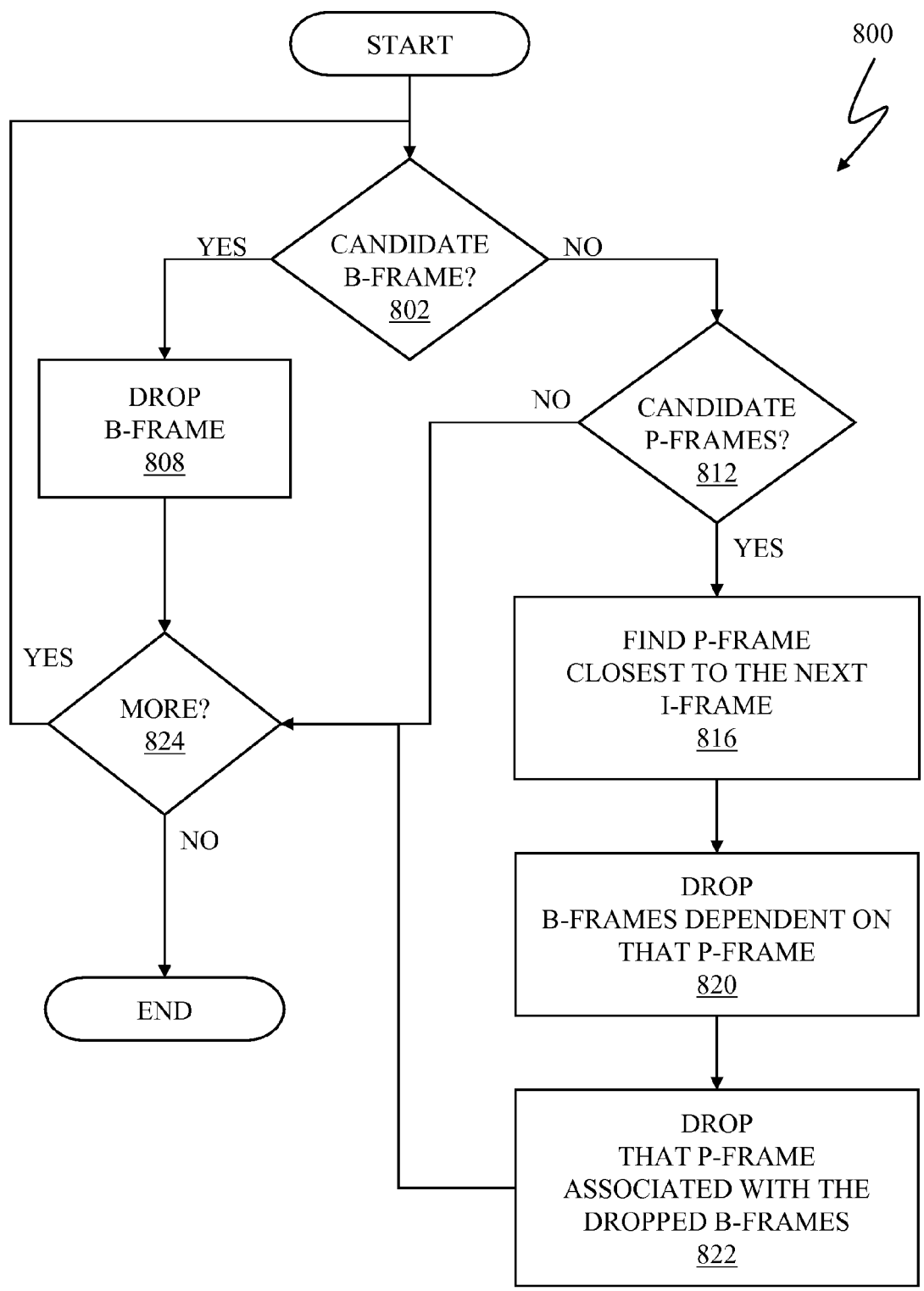
FIG. 8 is a more detailed flowchart showing the manner in which content elements, particularly frames, may be dropped, according to an embodiment of the invention.
Figure 9:
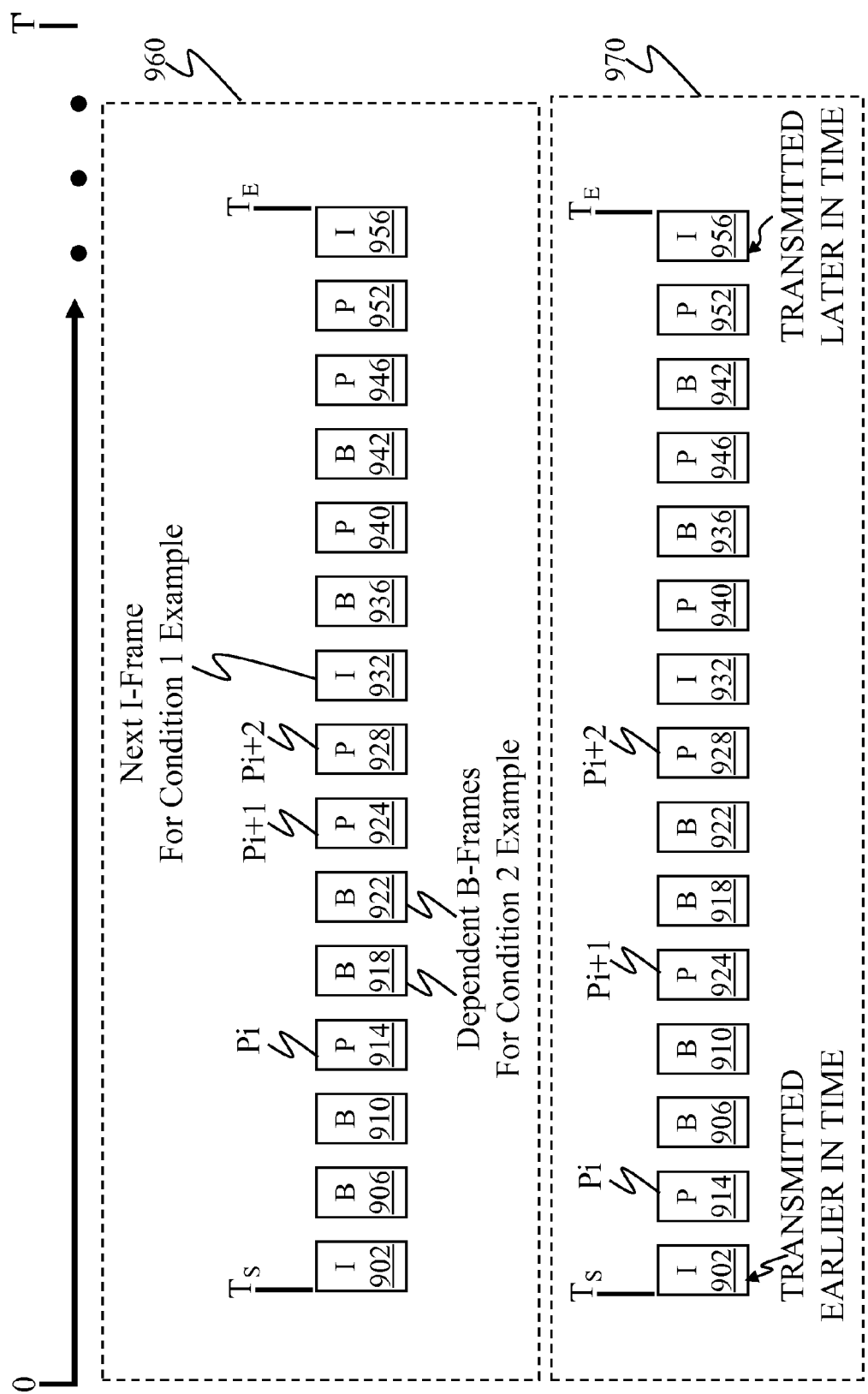
FIG. 9 is another exemplary bit stream that may be processed by the selective dropping entity, according to an embodiment of the invention.

FIG. 8 is a flowchart of an exemplary selective process 800. FIG. 9 illustrates a set of frames within an interval [$T_S$, $T_E$] from which content elements 902-956 are selected for dropping or filtering. The top set of frames illustrates 960 an exemplary display order of a video sequence and the bottom set of frames 970 illustrates the same exemplary video sequence but with a bit stream showing a typical decoding/decoder order. The selected interval [$T_S$, $T_E$] is within the [0, $T_c$] clip or frame drop valid interval. FIGS. 8 and 9 are discussed in conjunction with each other. In general, the selective dropping process may select to drop/filter B-frames and/or P-frames. The selective dropping process may employ one or more of the following strategies:

a) Dropping B-frames:

The selective dropping process may choose any B-frame (decision 802) to drop. Considering there is least or no dependency on B-frames, dropping B-frames (step 808) within the [$T_S$, $T_E$] interval typically does not disrupt any coding dependency. Each B-frame 906, 910, 918, 922, 936, 942 within [$T_S$, $T_E$] is a candidate for frame dropping.

b) Dropping P-frames:

The selective dropping process of P-frames is also based on dependency information. P-frames may also be selected as candidates to be dropped (decision 812). Considering a P-frame depends on a previous I- or P-frame—which is typically previous or earlier in the transmission order (e.g., the later P-frame 924 depends on the earlier P-frame 914), i.e., if transmitted, transmitted earlier by the encoder, dropping the P-frame which is later in transmission order and closest to the next I-frame, least or minimally disrupts the frame dependency (step 816). Similarly, considering B-frames depend on P-frames, first dropping B-frames dependent on that P-frame is suggested (step 820) before dropping that P-frame (step 822). Thus, one of the following conditions may be applied:

i.) Condition 1: Before dropping a P-frame $P_i$, all the P-frames $P_{i+1}$, $P_{i+2}$, . . . , until the next immediate I-frame in decoding order are typically dropped first prior to dropping that $P_i$-frame.

Referring to FIG. 9, for example, before a selective dropping process drops a candidate P-frame $P_i$ 914, the SDE process typically determines all the other P-frames, $P_{i+1}$ 924 and $P_{i+2}$ 928 before the next immediate I-frame 932.

ii.) Condition 2: Before selecting a candidate P-frame $P_{i+1}$ 924 to drop, first drop all B-frames 918, 922 dependent on that frame $P_{i+1}$ 924 prior to dropping the $P_{i+1}$ frame.

The embodiments of the invention may apply exemplary conditions 1 and 2 together or individually. The dropping process may be repeated (step 824).

In other embodiments of the invention, a distribution condition is applied. For example, if the frame drop interval [$T_S$, $T_E$] has multiple I-frames within that interval, the frames to be dropped are selected such that the frames dropped are distributed evenly, including substantially evenly, between each I-frame or on the overall clip or frame drop timeline or within the clip interval or sub-intervals, in general. This may be used, for example, when I-frames are spaced periodically. If B-frames are dropped, the dropping of B-frames may be spread evenly in the frame drop interval [$T_S$, $T_E$], for example.

The SDE may choose to drop content elements one by one using the above described conditions or criteria. Alternatively, the SDE may select to drop content elements based on the following:

i) Let us assume for illustrative purposes that the suggested original minimum initial buffering or initial decoder buffer fullness F for the original bit stream is $F_0$, where no frames are dropped. The embodiments of the invention thus reduce that $F_0$ value to a lower value $F_i$, wherein the initial value $F_i$ for the bit stream with a frame $fr_i$ dropped is typically calculated based on an HRD buffer model and for a bit stream with $\{b_1, b_2, \ldots, b_{i-1}, 0, b_{i+1}, \ldots, b_N\}$ bits.

ii) The selective process/SDE may calculate the initial value $F_i$ for each candidate frame to be dropped.

iii) Then, the selective process may then select the next frame to drop as the one that results in the lowest value for $F_i$, i.e., the maximum reduction in the initial buffering delay D compared to not dropping that frame. This process may select subsequent frames to drop by following the above steps repeatedly.

The sender thus sends the filtered bit stream to the receiver. The receiver receives the bit stream and may start playback more quickly considering that there's a lower minimum initial buffering F, thereby reducing the initial buffering delay D (e.g., D=F/R). The receiver may then display the frames based on their timestamps or other criteria. A receiver typically may not need to do any special processing to handle dropped frames. Alternatively, the receiver may perform receiver/client-side processing, e.g., frame repeat/field repeat/frame interpolation to insert frames to compensate for the dropped frames.

Figure 10:
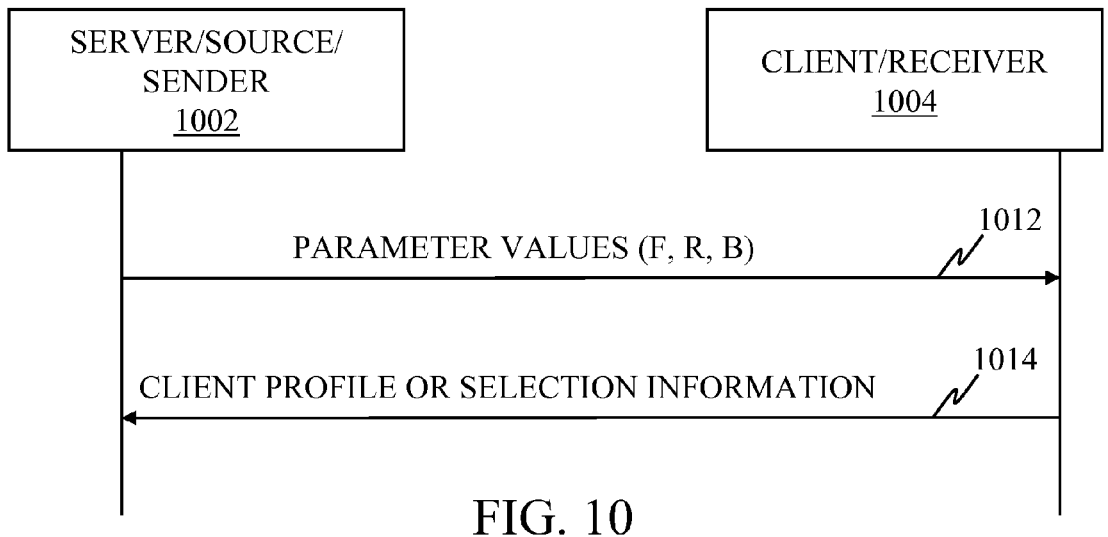
FIG. 10 is a high-level data flow diagram illustrating a manner in which messages may be exchanged between a server and a client, according to an embodiment of the invention.

FIG. 10 is a high-level block diagram showing an exemplary embodiment of how parameters may be exchanged between a sender/server/transmitter/source/media server 1002 and a receiver/client/media player/media renderer 1004 to influence the minimum initial or start-up delay D. In some embodiments, the transmitter/source 1002 may be an intermediary node, such as a proxy server. The SDE typically resides closest to where transmission may occur and/or encoding may occur, and may create multiple suggested minimum required initial buffering values F, and suggested minimum required buffer size B for a given transmission rate R for a particular bit stream B. The sender or the SDE may advertise all these typically suggested minimum initial buffering values to the client 1012. The suggested minimum initial buffering value may be represented using byte units or time units.

The receiver 1004 may choose a particular minimum initial buffering value F for the bit stream 1014. This selection may be based on at least one of the following:

a) The user may have configured a value for the initial buffering delay D that the user is willing to wait. The receiver thus chooses one of the F values closest to the one configured by the user.

b) The receiver may automatically configure a value for the initial buffering delay D based on past user behavior or other user-environment factors. For example, an entity, e.g., application on the client, keeps track of situations wherein the user abandons streaming sessions for initial delays D greater than certain values. The F value assigned by the receiver is then less than this value to avoid further abandonment or cancellation of streaming session requests.

c) The receiver may have a user interface adapted to present various initial buffering delay values from which a user may select. The receiver accordingly selects the appropriate F value based on user input. Alternatively, the SDE may not advertise multiple values. The client instead may specify a value for initial buffering delay and communicate this to the SDE.

The receiver typically communicates 1014 the receiver selected or determined minimum initial value F or any other client-profile information or selection to the SDE 1014. Based on the received information, accordingly adjusts the F value and accordingly drops one or more frames.

In other embodiments, the SDE or server may have a reconfigurable defined minimum initial buffering value F based on common user behavior/consumer expectations. These statistics, for example, may be gathered by a streaming server and thus dictates the defined reconfigurable initial buffer delay. This may be gathered, for example, by source providers. The SDE may drop frames to attempt to meet this selected minimum initial buffering. For example, the SDE may select to drop frames till the minimum initial buffering delay becomes equal to or less than 0.5 seconds. In some embodiments, a combination of one or more of the above client-side, server-side, or SDE-side configuration may be employed.

Figure 11:
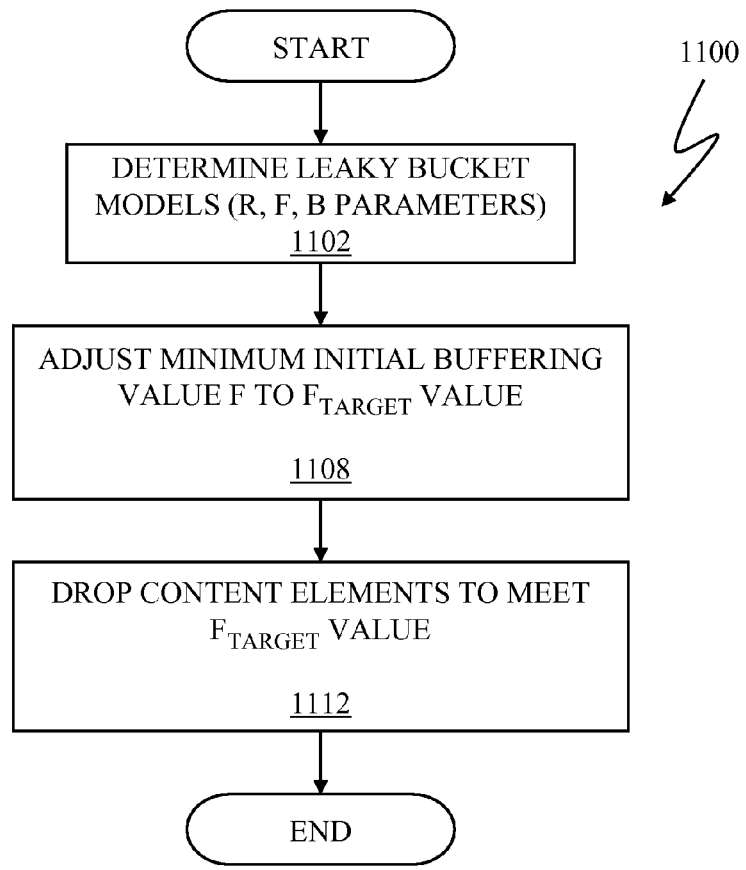
FIG. 11 is another high-level flowchart illustrating a manner in which the initial delay encountered at the client may be reduced or improved, according to an embodiment of the invention.

FIG. 11 is an exemplary flowchart 1100 showing how the initial buffering delay D may be reduced by dropping content elements to reduce the initial decoder buffer fullness F. Typically, the HRD determines a number of leaky bucket models with each model defined by a set of parameters containing transmission rate (R), initial decoder buffering (F), and decoder buffer capacity (B) (step 1102). Based on server-side, SDE, or client-side configuration (see FIG. 10), the minimum initial buffering value F is adjusted to a lower $F_{TARGET}$ value (step 1108). Content elements are dropped to meet $F_{TARGET}$ value (step 1112)

Figure 12:
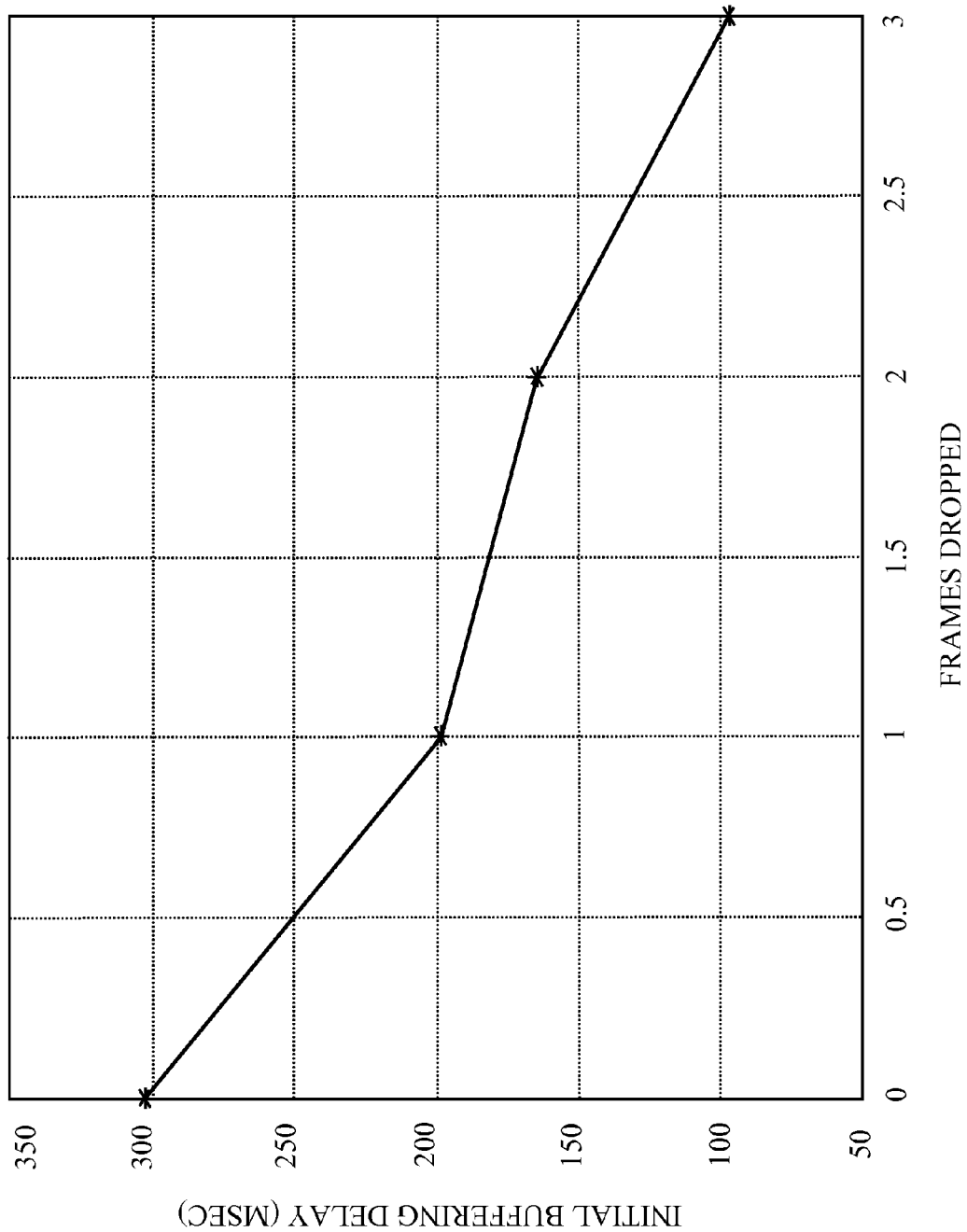
FIG. 12 is a graph showing an exemplary test result, according to an embodiment of the invention.

FIG. 12 is an exemplary result, generated in a test environment for an encoded and pre-stored source content, showing that the initial buffering delay D decreases as the number of frames dropped is increased.

The SDE processes described above explains selective frame dropping for typically pre-encoded and/or pre-stored source content. Other alternative embodiments are further described below, which generally relate to real-time encoding. The exemplary embodiments, however, may also apply, with little or no variations, to those source contents that are encoded and pre-stored.

Figure 13:
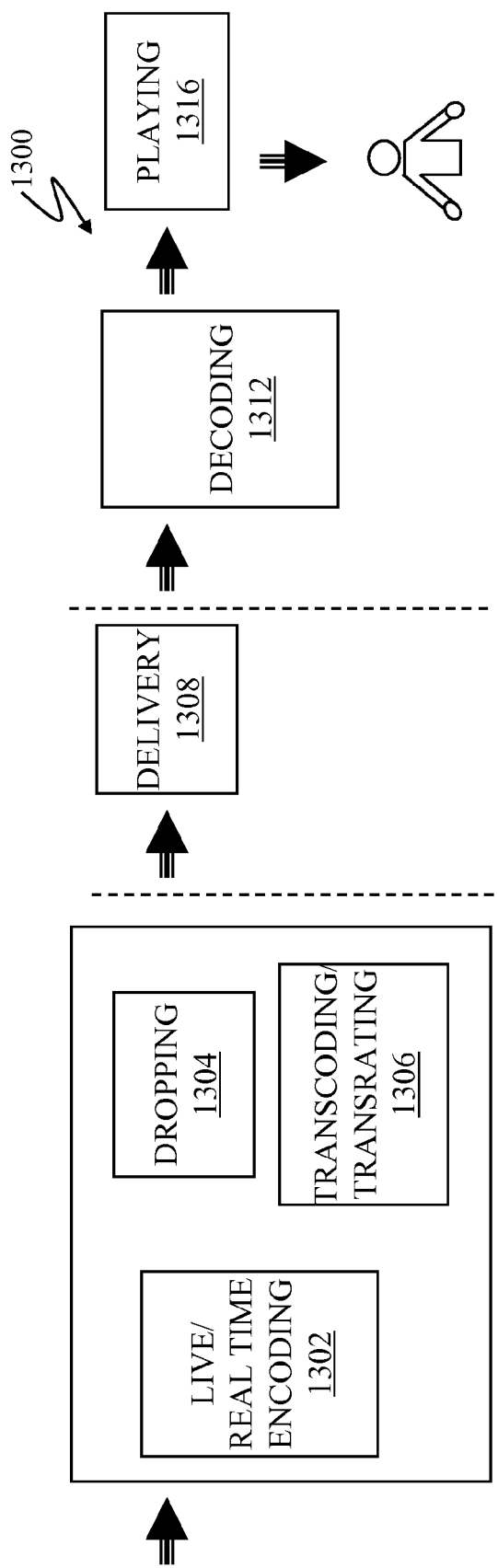
FIG. 13 is a high-level block diagram of source content distribution where the source content is encoded in real-time, according to an embodiment of the invention.

FIG. 13 is another exemplary embodiment 1300, wherein an SDE process is performed to reduce initial buffer latency D. This embodiment relates to dropping of on-line or real-time encoded content elements utilizing an HRD buffer model, e.g., as described in the GHRD document. The HRD is also used to calculate buffer state. This embodiment is similar to FIG. 2, but here the encoding 1302 is done in real-time, e.g., for live broadcast, and the dropping/filtering 1304 is performed concurrently, simultaneously, or immediately after or combined with the encoding process. In some embodiments, the encoding process is part of the transcoding or transrating process 1306 and the dropping process interfaces or is combined with the transcoding or transrating process. The dropping process may also be performed simultaneously, concurrently, or immediately after the transcoding or transrating process.

Based on the buffer state, the SDE process drops recently encoded content elements or portions thereof, to keep the amount of suggested minimum initial buffering F below a specific value. The SDE process may also include re-encoding/encoding, including transcoding or transrating, of recently encoded content elements or portions thereof. The SDE process may be used, for example, when encoding a video/source content and storing it. The SDE process, however, may be applied without having to wait for the encoder to complete encoding the entire source content, i.e., without waiting for the entire encoded bit stream to be available.

The SDE process, for example, may be used by a source or server with a "live" or real-time encoder and transmitter for streaming data. In this embodiment, the sender/source side is capturing the live event, e.g., a live concert, and encoding 1302 it, while the receiver is decoding 1312 and rendering/presenting 1316 that live concert to the user. There may, however, be a latency associated with when the event actually occurs and when the encoder encodes and transmits a frame corresponding to that event. Furthermore, there may be a latency perceived by the receiver which is associated with when a receiver starts receiving the media stream and when it may start displaying it. This latency perceived by the receiver is thus reduced using the SDE process. In this embodiment, the sender may be capable of holding a few encoded frames in its transmission buffer before actually transmitting them.

After the SDE process, the filtered source content is then delivered by transmission over network segments 1308, decoded 1312, played or rendered 1316 for viewing by a user. The SDE process employs a "look-back" strategy, which makes a decision to drop one or more past encoded content elements, if appropriate, to achieve a suggested minimum initial buffering latency D.

Figure 14:
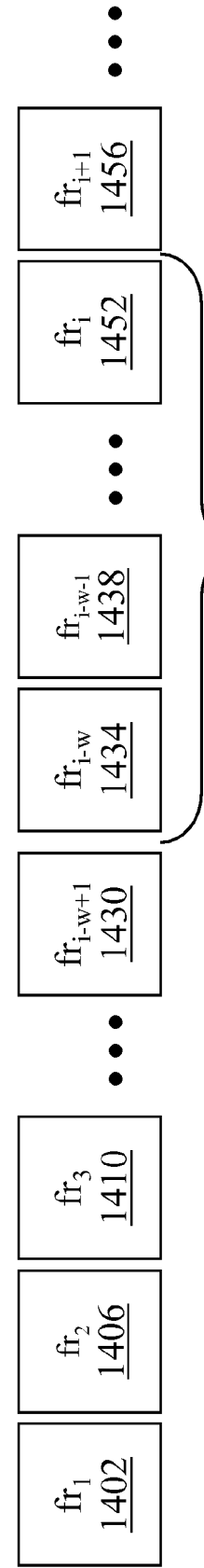
FIG. 14 is another exemplary bit stream indicating a sliding clip interval, according to an embodiment of the invention.

FIG. 14 is a diagram showing exemplary encoded content elements of a source content. For illustrative purposes, let us consider a source server with a transmitter and a real-time encoder encoding a source content. The source content is encoded into a number of encoded frames labeled $\{fr_1, fr_2, fr_3, \ldots, fr_{i-w}, \ldots, fr_i, \ldots\}$ 1402, 1406, 1410, 1430, 1434 1438, 1452, 1456. Let us denote the number of bits taken by the encoded frames above as $\{b_1, b_2, b_3, \ldots, b_{i-w}, \ldots, b_i, \ldots\}$.

Let us consider a situation where the encoder of a source server has already encoded media frames till frame $fr_i$ 1452. The source server may have already "committed"—stored to file or transmitted over the network—past recently encoded media frames till frame $fr_{i-(w+1)}$. The sender side is adapted to drop and/or encode, including re-encode, frames $[fr_{i-w}, \ldots, fr_i, \ldots]$ 1434, 1438, 1452. This group of content elements is within a clip or frame drop valid interval 1470, wherein such content elements may be dropped or encoded again. The clip or frame drop interval 1470, in this embodiment, is a sliding window of frames $[fr_{i-w}, fr_{i-(w-1)}, \ldots, fr_i]$ 1434, 1438, 1452, which are candidate (w+1) frames that may be filtered by the SDE process to reduce the suggested initial latency for the receiver. In some embodiments, $fr_{i-w}=fr_i$, i.e., the sender side may only have ability to make a decision about the most recently encoded frame. The sliding window in that case only includes that frame $fr_i$.

Figure 15:
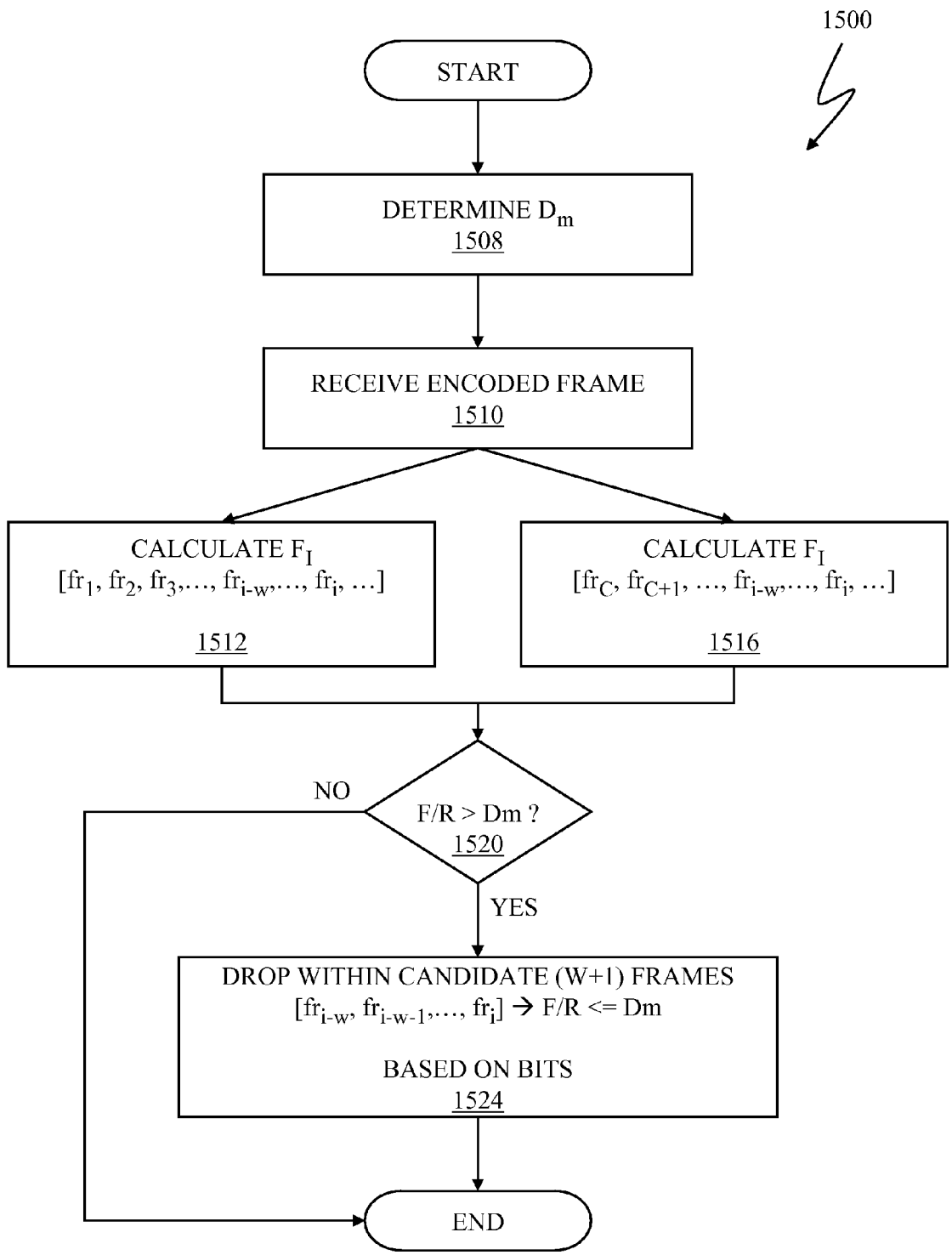
FIG. 15 is a high-level flowchart showing an exemplary selective dropping entity process, according to an embodiment of the invention.

FIG. 15 is a high-level flowchart showing an exemplary SDE process 1500 according to some embodiments of the invention. In this embodiment, a maximum initial buffer delay $D_m$ is specified or determined (step 1508), either by the client or the server. After receiving an encoded frame $fr_i$ (step 1510), the sender, particularly the SDE, using the model(s) of the HRD, e.g., of H.264/AVC, calculates an F value for the suggested minimum initial buffering $F_i$ for the sequence of frames. In embodiments where the sender is storing frames as they are encoded, e.g., for later transmission or for pre-stored encoded contents, the sequence of frames used to calculate the value of $F_i$ are typically frames $[fr_1, fr_2, fr_3, \ldots, fr_{i-w}, \ldots, fr_i, \ldots]$ (step 1512). In embodiments, where the sender is streaming encoded frames for a live event, the sequence of frames used to calculate value of $F_i$ is frames $[fr_C, fr_{C+1}, \ldots, fr_{i-w}, \ldots, fr_i, \ldots]$ where frame $fr_C$ may be the most recently transmitted I-frame (step 1516). Furthermore, in some embodiments, the $F_i$ value may be calculated for all sequence or subsequence of frames starting with an I-frame or random access frame starting at C=1.

Referring to the H.264/AVC, HRD described in the GHRD document, an exemplary pseudo-code calculation may be performed, as shown in Table I.

TABLE I

Exemplary Pseudo-Code to Reduce Initial Buffering Delay D

| Line | Pseudo-Code |
|---|---|
| 1 | M = i − C + 1; |
| 2 | |
| 3 | for (j = 1; j <= M; j++) |
| 4 | {   //initialization |
| 5 | bufl(j) = buf2(j) = 0; |
| 6 | } |
| 7 | bufl(M) = 0; |
| 8 | |
| 9 | F = 0;   //initial minimum delay buffer initialized to 0 |
| 10 | for(j = C; j <= i; j++) |
| 11 | { |
| 12 | buf2(j) = bufl(j) − b(j); |
| 13 | if (buf2(j) < 0) |
| 14 | { |
| 15 | F = F − buf2(j); |
| 16 | If ((F/R) > Dm) |
| 17 | { |
| 18 | //If the current delay (F/R) is greater than the Dm: |
| 19 | //Choose one or more frames to drop from |
| 20 | //candidate (w+1) frames [fr(i−w), ..., fr(i)] |
| 21 | //such that (F/R) <= Dm; |
| 22 | } |
| 23 | } |
| 24 | bufl(j+1) = buf2(j) + R/f; |
| 25 | if (bufl(j+1) > B) |
| 26 | { |
| 27 | bufl(j + 1) = B; |
| 28 | } |
| 29 | } |
| 30 | |
| 31 | where B = buffer size, f = frame rate in frames per second, and |
| 32 | R = bit rate in bits per second. |

When the condition F/R>Dm (test 1520) occurs, line 16 of Table I, the sender side performs an SDE action. In this case, the sender side chooses one or more frames from the (w+1) candidate frames [fri-w, . . . , fri] to be dropped/filtered (step 1524). The sender side may use the following priority or coding-dependency conditions, similar to those discussed above, to choose a frame to drop from the candidate frames:
  i) Dropping B-frames:
    The sender side SDE may choose any B-frame to be dropped without causing any effect on the media coding of other frames.
  ii) Dropping P-frames:
    If the W candidate frames include one or more intra-coded I-frames, the sender side may choose to drop one or more P-frames previous in order before the next I-frame, starting with the last P-frame just before the next I-frame and going backwards in the sequence. The following rules may be followed:
      a) Condition 1: Before dropping a P-frame $P_j$, all the P-frames $P_{j+1}, P_{j+2}, \ldots$, until the next immediate I-frame are typically dropped first prior to dropping that $P_j$ frame.
      b) Condition 2: Before selecting a P-frame $P_{i+1}$ to drop, first drop all the B-frames dependent on that frame $P_{i+1}$ prior to dropping the $P_{i+1}$ frame.

In other embodiments, the SDE may choose to drop the most recently encoded frame without following the above conditions. In this embodiment, the encoder, when encoding the next frame, may consider the fact that the previous frame was dropped and thus such dropped frame may not be used as a reference frame.

For each candidate frame $fr_j$ to be dropped, the sender side calculates the value for D, where D=F/R, for the sequence of bits $\{b_1, \ldots, b_{j-1}, 0, b_{j+1}, \ldots, b_i\}$. Considering that $fr_j$ is to be dropped, $b_j$ is set to zero. The sender may then select the next frame to drop as the one which results in the maximum or at least improved reduction in the value for D, e.g., compared to not dropping that frame. The sender may also select subsequent frames to drop by following the above steps repeatedly until F/R<=Dm.

In some embodiments, the sender may choose to drop only part of a frame instead of an entire frame. Also in some embodiments the sender side may re-encode, e.g., transcode or transrate, one or more recently encoded frames instead of dropping them completely or partially. In some embodiments one or more of the above steps may be taken by the encoder. In some embodiments the encoder may be a two pass encoder and some of these steps may be taken after the first pass.

Figure 16:
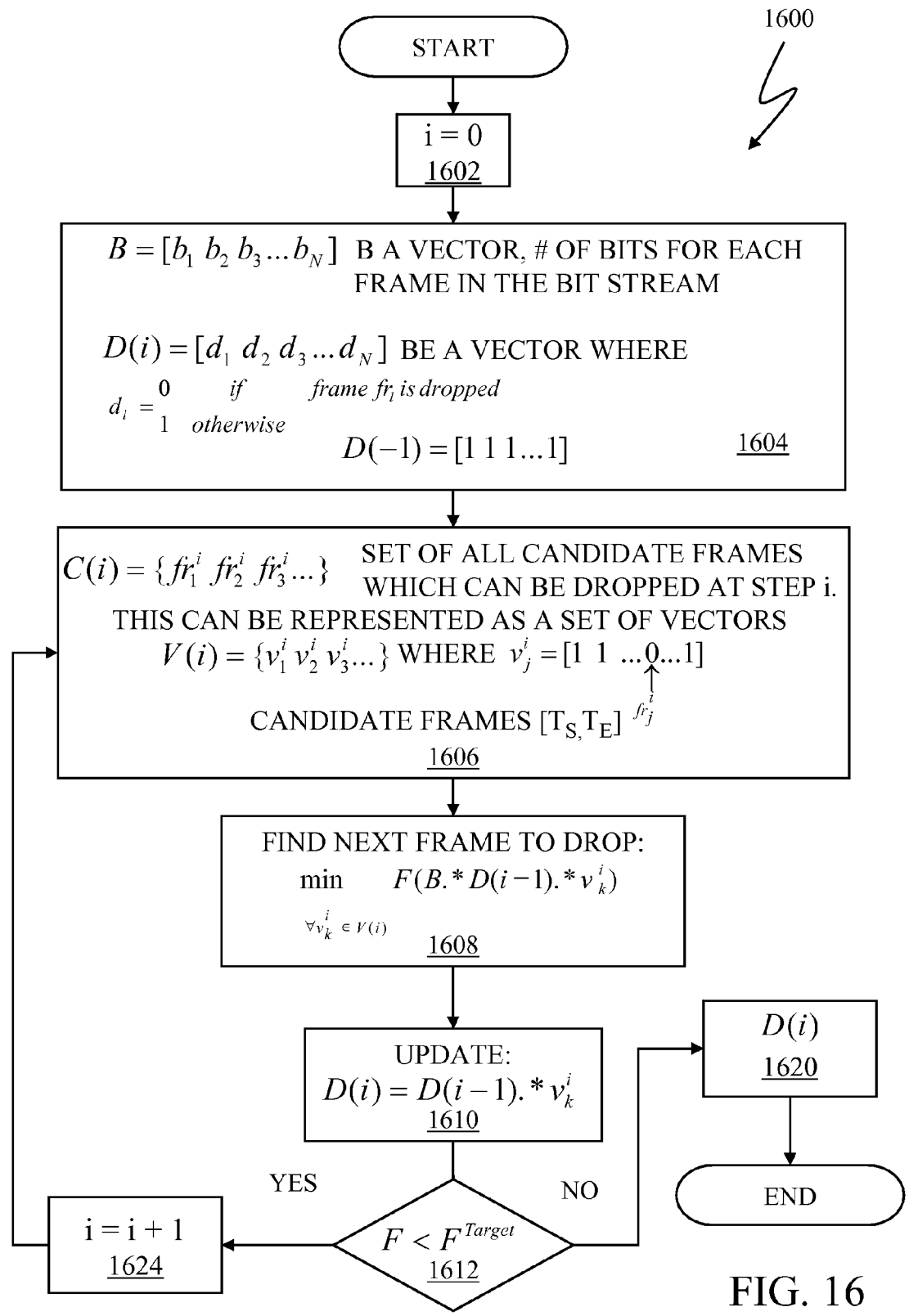
FIG. 16 is another high-level flowchart showing an exemplary selective dropping entity process, according to an embodiment of the invention.

FIG. 16 is a high-level flowchart showing an exemplary hypothetical reference decoder model based on the selective dropping entity process 1600 described herein. An initialization phase is performed such as setting i to zero (step 1602) and defining vectors, where $B=[b_1\ b_2\ b_3\ \ldots\ b_N]$ is a vector corresponding to the number of bits for each frame in the bit stream and $D(i)=[d_1\ d_2\ d_3\ \ldots\ d_N]$ is a vector where $d_1$ is a binary variable with value "0" if frame $fr_1$ is dropped and "1" otherwise, the vector is $D(-1)=[1\ 1\ 1\ \ldots\ 1]$ (step 1604). Let $C(i)=\{fr_1^i\ fr_2^i\ fr_3^i \ldots\}$ be a set of all candidate frames, which may be dropped at step i. These candidate frames may be represented as a set of vectors $V(i)=\{v_1^i\ v_2^i\ v_3^i \ldots\}$ where $v_j^i=[1\ 1\ \ldots\ 0\ \ldots]$, and $fr_j^i$ is the "0" value (step 1606). These candidate frames are within the drop interval $[T_S, T_E]$, considering certain conditions, e.g., media coding-dependency chain as described above. The next frame to drop is selected based on obtaining the minimum F value using min $F(B.*D(i-1).*v_k^i)$ for every $v_k^i$ member of vector V(i). The ".*" notation is a MATLAB™ notation for an element-by-element multiplication (step 1608). The D(i) is updated by $D(i)=D(i-1).*v_k^i$ (step 1610). A check is then made whether the initial minimum buffering value is less that a given target F value (step 1612), and if this condition is met, D(i) at that point contains information about frames to be dropped (step 1620), otherwise, i is incremented (step 1624).

Figure 17:
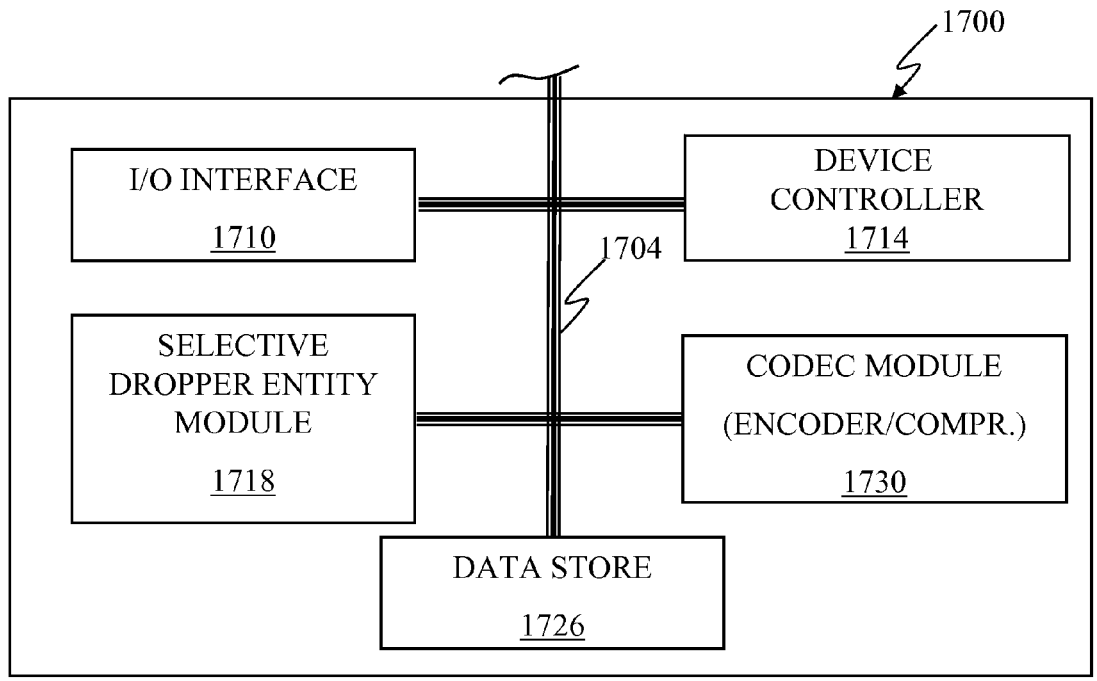
FIG. 17 is a block diagram of an exemplary device, according to an embodiment of the invention.

FIG. 17 is a high-level functional block diagram of an exemplary server or sender device 1700 adapted to perform the SDE process described herein. Typically, a device 1700 includes an input/output (I/O) interface module 1710 that enables the device 1700 to communicate and/or operably couple with other devices within a network. The device 1700 may also include a data store 1726, permanent and/or temporary, such as hard drive, flash memory, smart drive, RAM, etc. The data store 1726 may also include a buffer area, e.g., a transmission buffer if functioning as a sender or server. The device 1700 may also include a selective dropping entity module 1718 adapted to perform the selective dropping entity function described herein, including calculations, for example, to calculate the initial decoder buffer fullness F based on the bit stream. The device 1700 may also include a codec module 1730 adapted to perform encoding and/or compressing of source contents. Depending on whether the source content is a live content, real-time encoding may also be performed. The device may also include a device controller 1714 adapted to control the overall activities of the device 1700.

Figure 18:
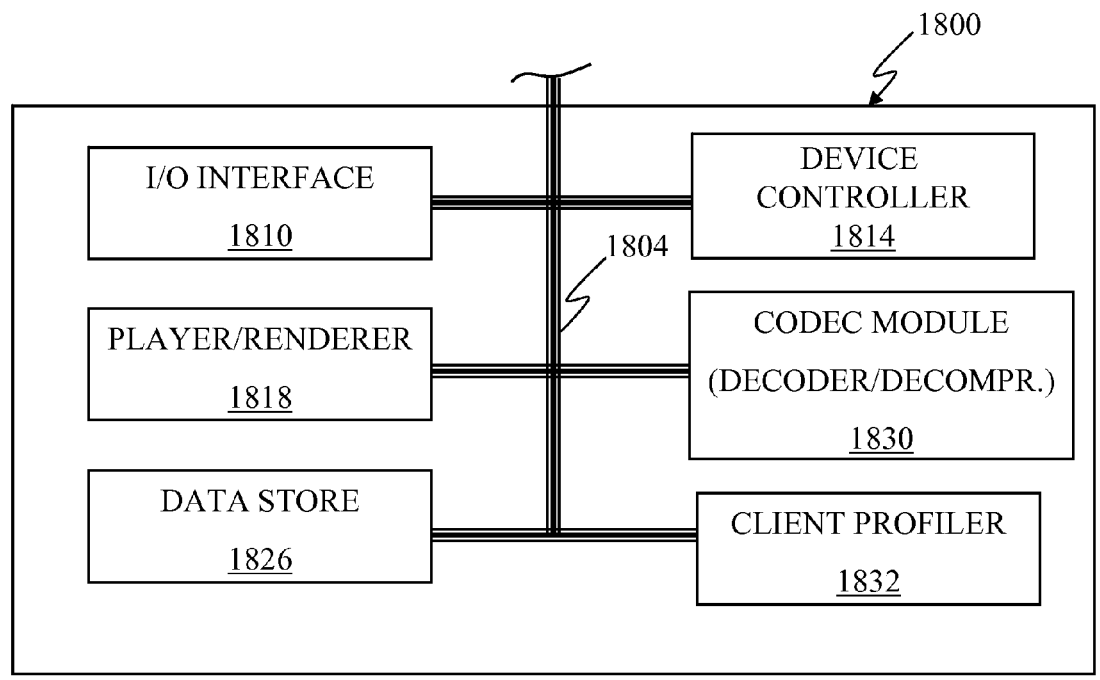
FIG. 18 is another block diagram of another exemplary device, according to an embodiment of the invention.

FIG. 18 is a high-level functional block diagram of an exemplary client device 1800 adapted to decode and receive the filtered source content, according to some embodiments of the invention. This client device 1800 includes an input/output (I/O) interface module 1810 that enables the device 1800 to communicate and/or operably couple with other devices within a network. The device 1800 may also include a data store 1826, permanent and/or temporary, such as hard drive, flash memory, smart drive, RAM, etc. The data store 1826 may also include one or more buffer areas, e.g., a pre-decoder buffer area. The device 1800 may also include a codec module 1830 adapted to decode and/or decompress the received filtered source content. This codec module 1830 may also perform other client-side processing, e.g., error detection, correction, concealment, etc. The client profiler 1832 may be adapted to interface with a user and/or a server, such that device configuration information, e.g., the maximum delay a user is willing to wait may be provided into the device as an input and/or transmitted to a server. The device 1800 depending on its function may also include a player/renderer 1818 such that content elements decoded by the codec module 1830 may be presented to a user. The device may also include a device controller 1814 adapted to control the overall activities of the device 1800.

In some embodiments of the invention, the different modules in FIGS. 17 and/or 18, may communicate and interface with each other via a bus, dedicated signal paths or one or more channels 1704, 1804. Depending on the function of the device, other modules, including functions and capabilities, may be added or removed. Furthermore, the modules described herein may be further subdivided and combined with other functions so long as the function and processes described herein may be performed. The various modules may also be implemented in hardware, software, or both, i.e., firmware.

Embodiments of the present invention may be used in conjunction with networks, systems, and devices that may employ other hypothetical decoder models and/or utilizes initial client buffering. Although this invention has been disclosed in the context of certain embodiments and examples, it will be understood by those or ordinary skill in the art that the present invention extends beyond the specifically disclosed embodiments to other alternative embodiments and/or uses of the invention and obvious modifications and equivalents thereof. In particular, content elements other than frames, e.g., layers may also be dropped by the selective dropping feature of the present invention. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of reducing initial buffer latency at a client, the method comprising:
    filtering, by a computer processor of a server, a bit stream comprising one or more encoded content elements of a source content by dropping at least one of the one or more encoded content elements within a drop interval, wherein the drop interval is associated with the initial buffering delay value at the client and wherein the dropping is based on dropping first a P-frame closest to a next I-frame prior to dropping another P-frame farther away from the next I-frame.

2. The method of claim 1, wherein the drop interval associated with the initial buffering delay at the client is further based on an initial decoder buffer fullness.

3. The method of claim 1, wherein the initial buffering delay value is based on a configuration input.

4. The method of claim 1, further comprising:
encoding a source content into the one or more encoded content elements of the bit stream.

5. The method of claim 4, wherein the drop interval is a sliding window based on which of the one or more encoded content elements of the bit stream is being encoded.

6. The method of claim 5, wherein the sliding window contains only the content element most recently encoded.

7. The method of claim 1, further comprising:
receiving by the client the filtered bit stream; and
when an initial decoder buffer fullness is reached, decoding the filtered bit stream.

8. The method of claim 7, further comprising:
presenting the source content.

9. The method of claim 1, wherein the drop interval comprises one or more subintervals.

10. The method of claim 1, further comprising:
determining the drop interval.

11. The method of claim 1, wherein the dropping at the step of filtering the bit stream is based on a condition.

12. The method of claim 11, wherein the condition is based on coding dependencies between the one or more encoded content elements.

13. The method of claim 11, wherein the condition is based on a number of bits associated with each of the one or more encoded content elements.

14. The method of claim 11, wherein the condition is based on a number of bits associated with each of the one or more encoded content elements previously dropped.

15. The method of claim 11, wherein the dropping of the one or more encoded content elements in the step of filtering the bit stream is distributed evenly within the drop interval.

16. The method of claim 1, wherein the initial buffering delay at the client is based on a hypothetical decoder model adapted to support H.264/AVC.

17. The method of claim 1, wherein the step of filtering the bit stream by dropping at least one of the one or more encoded content elements within the drop interval is repeated until at least one of the following conditions is met:
a target initial buffering value is reached; and
the initial buffering delay value is not reduced by further performing the dropping of the encoded content elements by the step of filtering.

18. A device configured to be operably coupled via one or more network segments to a client, the device comprising:
an input/output interface configured to operably couple the device to the client via the one or more network segments; and
a selective dropper entity module configured to:
filter a bit stream comprising one or more encoded content elements of a source content by dropping at least one of the one or more encoded content elements within a drop interval, wherein the drop interval is associated with an initial buffering delay at the client and wherein the dropping is based on dropping first a P-frame closest to a next I-frame prior to dropping another P-frame farther away from the next I-frame.

19. The device of claim 18 further comprising:
an encoder module configured to encode and compress the source content into the bit stream.

20. The device of claim 19 wherein the encoder module is configured to encode and compress in real-time.

21. The device of claim 18 wherein the selective dropper entity module is further configured to filter the bit stream by dropping based on a condition.

22. The device of claim 21 wherein the condition is based on coding dependencies between the one or more content elements.

23. A system comprising:
a first device operably coupled to a second device via one or more network segments, the first device comprising:
an input/output interface configured to operably couple the first device to the second device; and
a selective dropper entity module configured to:
filter a bit stream comprising one or more encoded content elements of a source content by dropping at least one of the one or more encoded content elements within a drop interval, wherein the drop interval is associated with an initial buffering delay at the second device and wherein the dropping is based on dropping first a P-frame closest to a next I-frame prior to dropping another P-frame farther away from the next I-frame; and
transmit the filtered bit stream to the second device;
the second device comprising:
an input/output interface configured to operably couple the second device to the first device; and
a decoder module configured to:
decode and decompress the received filtered bit stream; and
the one or more network segments.

24. A system comprising:
a first device operably coupled to a second device, the first device configured to transmit to the second device a bit stream associated with a source content;
the second device operably coupled to a third device, the second device configured to receive the bit stream transmitted by the first device, the second device comprising:
a selective dropper entity module configured to:
filter the bit stream comprising one or more encoded content elements of the source content by dropping at least one of the one or more encoded content elements within a drop interval, wherein the drop interval is associated with an initial buffering delay at the third device and wherein the dropping is based on dropping first a P-frame closest to a next I-frame prior to dropping another P-frame farther away from the next I-frame; and
transmit the filtered bit stream to the third device; and
the third device comprising:
a decoder module configured to:
decode and decompress the received filtered bit stream from the second device.

25. The system of claim 24 wherein the bit stream is one of the following:
encoded in real time and previously encoded.

26. A method comprising:
reducing initial buffer delay value at a client computing device, wherein the reducing is based on a set of parameters transmitted by the client to a server computing device;
determining, by the server, a drop interval based on the received transmitted parameters from the client; and
dropping, by the server, at least one or more encoded content elements of a bit stream within the determined drop interval based on dropping first a P-frame closest to a next I-frame prior to dropping another P-frame farther away from the next I-frame, and the bit stream comprising one or more encoded content elements of a source content for server transmission.

27. The method of claim 26, further comprising:
re-encoding, by the server, the one or more encoded content elements of the source content for server transmission.

28. The method of claim 27, further comprising:
dropping, by the server, at least one or more of the re-encoded content elements of the bit stream within the determined drop interval based on the one or more encoded content elements of a source content for server transmission.

29. The method of claim 26, wherein the dropping is performed by the server prior to a transmission of the source content for server transmission to the client.

30. The method of claim 26, further comprising:
advertising, by the server, a suggested minimum initial buffer value to the client.

* * * * *